(12) United States Patent
Hannesen et al.

(10) Patent No.: US 8,368,581 B2
(45) Date of Patent: Feb. 5, 2013

(54) METHOD FOR DETERMINING COMPOUND DATA OF WEATHER RADARS IN AN OVERLAPPING REGION OF THE MONITORING REGIONS OF AT LEAST TWO WEATHER RADARS

(75) Inventors: Ronald Hannesen, Düsseldorf (DE); Andre Weipert, Wegberg (DE)

(73) Assignee: Selex Systems Integration GmbH, Neuss (DE)

( * ) Notice: Subject to any disclaimer, the term of this patent is extended or adjusted under 35 U.S.C. 154(b) by 394 days.

(21) Appl. No.: 12/745,665

(22) PCT Filed: Nov. 27, 2008

(86) PCT No.: PCT/EP2008/010058
§ 371 (c)(1),
(2), (4) Date: Jun. 1, 2010

(87) PCT Pub. No.: WO2009/071232
PCT Pub. Date: Jun. 11, 2009

(65) Prior Publication Data
US 2010/0315432 A1    Dec. 16, 2010

(30) Foreign Application Priority Data

Dec. 3, 2007 (DE) .......................... 10 2007 058 345

(51) Int. Cl.
*G01S 13/00* (2006.01)
(52) U.S. Cl. ..................................... 342/26 R
(58) Field of Classification Search ............ 342/26
See application file for complete search history.

(56) References Cited

PUBLICATIONS

Carrie Langston et al: "Four-Dimensional Dynamic Radar Mosaic", Journal of Atmospheric and Oceanic Technology, American Meteorological Society, Boston, MA, vol. 24, May 1, 2007, pp. 776-790.
J. Zhang et al.: "Three-and-Four-Dimensional High-Resolution National Radar Mosaic", Proceedings of ERAD (2004), pp. 105-108.
Anonymous: "Weather Radar FAA Warning Applications" [Online], Nov. 21, 2006, Retrieved from the Internet: URS:http://sss.nssl.noaa.gov/research/radar/faa.php, retrieved on Mar. 16, 2009.
Jiang Zhang: "Constructing Three-Dimensional Multiple-Radar Reflectivity Mosaics: Examples of Convective Storms and Stratiform Rain Echoes", Journal of Atmospheric and Oceanic Technology, vol. 22, No. 1, Jan. 2005, pp. 30-42.
Watson R.J., et al: "Combining Ground Based Meteorological Radar Data From Multiple Overlapping Sites", Quantitative Remote Sensing for Science and Applications, Firenze, Jul. 10-14, 1995; [International Geoscience and Remote Sensing Symposium], New York, IEEE, US, vol. 3, Jul. 10, 1995, pp. 1660-1662.
European Office Action dated Jul. 27, 2012.
Marzano F.S. et al., *Supervised Fuzzy-Logic Classification of Hydrometeors Using C-Band Weather Radars*, IEEE Transactions on Geoscience and Remote Sensing, vol. 45, No. 11, Nov. 2007.

*Primary Examiner* — Timothy A Brainard
(74) *Attorney, Agent, or Firm* — Kilpatrick Townsend & Stockton LLP

(57) ABSTRACT

Method for determining combined data of weather radars (1) in an overlap region (2) of the observation regions of at least two weather radars (1), with polarimetric weather radars (1) being used as weather radars (1), and the measurements of the individual at least two polarimetric weather radars (1) being combined for measuring points in the overlap region (2), and the combined measuring points being used to carry out a radar echo classification.

8 Claims, 1 Drawing Sheet

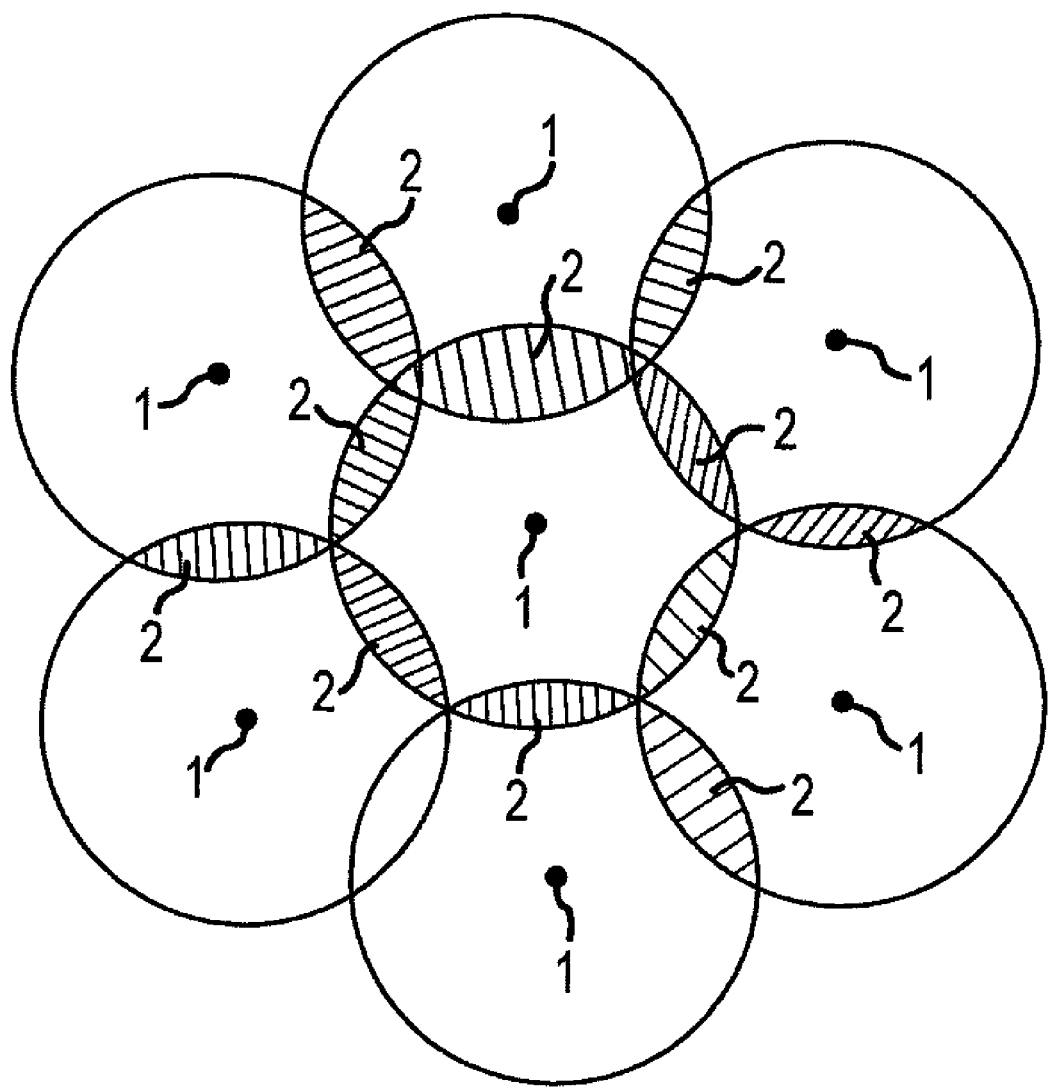

METHOD FOR DETERMINING COMPOUND DATA OF WEATHER RADARS IN AN OVERLAPPING REGION OF THE MONITORING REGIONS OF AT LEAST TWO WEATHER RADARS

The invention relates to a method for determining combined data of weather radars in an overlap region of the observation regions of at least two weather radars according to the preamble of claim 1.

Weather radars or precipitation radars are used for weather observation when acquiring weather data. Weather radars can be used to measure the water content of a cloud, which in turn permits conclusions relating to possible precipitation (rain, hail, snow etc.).

Weather radars emit electromagnetic waves via an antenna and receive back the electromagnetic waves scattered, inter alia, on precipitation particles, in order to evaluate them. The more water droplets a cloud contains, the more radiation it reflects back. The distance of the clouds from the weather radar is deduced from the time difference between transmitting the reflection and receiving the reflected radiation. These reflectivity data of a conventional weather radar thus deliver an image of the distance and water content of the cloud.

A specific type of precipitation radar is denoted as polarimetric radar; i.e., one in which differently polarized electromagnetic waves are emitted and received. Polarimetric weather radars are mostly used to emit a horizontally and a vertically polarized electromagnetic wave, and to receive in a corresponding fashion the retroreflected waves in these two polarizations.

Whereas conventional weather radars are capable of determining the intensity of the backscattered signal (and thus of the precipitation) and the speed of the precipitation in the direction of the weather radar, because of the different polarizations used polarimetric weather radars are capable of obtaining additional information, which enables a statement relating to the form of the precipitation particles (hydrometeors). Thus, polarimetric weather radars can be used to classify the radar echo type, for example by using a code table, namely Manual on Codes, International Codes, Volume I.1, WMO-No. 306, 1995 published by the World Meteorological Organization, Geneva, Switzerland. Thus, a polarimetric weather radar can be used to classify the precipitation particles and/or weather information, that is to say rain, hail, snow, sleet, storm etc., for example, that is to say qualitatively in terms of types. It is possible to carry out radar echo classification, that is to say the echo is classified in terms of weather information.

Each of the weather radars is designed for observing a limited vicinity around the weather radar. In recent years, combined weather radar networks have been set up in many countries in order to produce a comprehensive weather radar observation network; the United States of America and most European states now possess such equipment. Combined radar data are produced with the aid of the combined weather radar networks.

The production of the combined radar data which are called a radar composite or radar mosaic, presupposes the combined network of weather radars in which each individual radar unit produces local radar data that are the reflectivity data in the case of conventional weather radars. Since the individual local radar data can overlap one another in dependence on the locations (and the distance resulting therefrom) of the radar units and/or weather radars, various methods and decision criteria are used for the overlap regions, in order to calculate a "combined" value of the reflectivity for the overlap region.

In addition to the combined radar data based on the reflectivity, it is also possible to produce dual or multiple Doppler combined data in the case of which, for example, the multiple Doppler combined data are derived from the radial velocities of the local radar data.

The local radar data required for calculating in the overlap region can differ in their spatial nature. A distinction is made between 2-dimensional (2D), 3-dimensional (3D) and 4-dimensional (4D) calculations of combined radar data.

In the case of a 2D-2D calculation, the local radar data that are used to produce combined radar data are present in a two-dimensional, usually Cartesian format, and the combined radar data produced are likewise present in the two-dimensional format (2D).

In the case of a 3D-2D calculation, the local radar data that are used to produce combined radar data are present in a three-dimensional, usually polar, format (3D). Two-dimensional radar data are calculated from the three-dimensional format, and are used to produce the combined radar data. The combined radar data produced are present in the two-dimensional format (2D).

In a 3D-3D calculation, the local radar data that are used to produce combined radar data are present in a three-dimensional format (3D). The three-dimensional local radar data are used to produce three-dimensional combined radar data (3D) that are subsequently converted into a two-dimensional format that can be displayed. The combined data system represented is preferably in the Cartesian or geo-referenced (geographic longitude and latitude and height about MSL) format.

In the case of a 3D-4D calculation, the local radar data that are used to produce combined radar data are present in a three-dimensional format (3D), the weather radar picking up the radar data in a predetermined time sequence. As soon as new three-dimensional local data of a radar unit are produced, the new data are used to calculate the three-dimensional combined radar data (4D), that is to say three-dimensional partial information relating to the three-dimensional combined radar data is replaced successively by current local radar data.

Other independent measurements, for example temperature, can also be taken into account for an individual weather radar. Such a result can be associated with a likewise resulting quality and weighting factor stating that the result is more reliable the higher this factor. Some methods in the evaluation of local radar data, in particular so-called fuzzy logic algorithms, result for each measuring point in a plurality of different radar echo types with respectively associated quality or weighting factors, wherein generally the echo type which has the largest associated quality and weighting factor is used as final result. Fuzzy logic-based methods are certainly used but only to determine a classification of the radar echo for individual radar systems, that is to say for local radar data.

It is known from Zhang, J., Gourley, J. J., Howard, K. and Maddox, B., "Three-dimensional gridding and mosaic of reflectivities from multiple WSR-88D radars", 30th International Radar Conference, 19 to 24 Jul. 2001, Munich, Germany, pages 719 to 721 that problems arise in the overlap regions of the weather radar forming the combined network. The problems are based, inter alia, on the distribution of measured values of the weather radar. Whereas the measuring points are spaced apart from one another by one kilometer near the weather radar, at a greater distance, the measuring points are spaced apart from one another horizontally by approximately 100 kilometers, and vertically by 5 kilometers. Said publication designates the procedure in the overlap regions as nontrivial, and different modes of procedure and/or interpolations are presented.

It is known from Zhang, J., Howard, K., Langston, C., Wang, S., Qin, Y, "Three- and four-dimensional high resolution national radar mosaic", Proceedings of ERAD 2004, ERAD 2004, pages 105 to 108 to produce combined radar data for a conventional weather radar by using a standardized 3D format to image the reflectivity measurements of each individual weather radar at a specific time while taking account of influences that cannot be ascribed to meteorological conditions. The data in the overlap region are weighted as a function of the distance of the respective weather radar from the measuring point, and the values of weather radars at a greater distance are weighted less than the values of weather radars at closer distances. Further factors that determine the measurement such as, for example, terrain factors or further influences, are not taken into account in this case.

By contrast with combined data of radar reflectivity (conventional weather radars), there has so far not been any development of combined data (2D-2D, 3D-2D, 3D-3D, 3D-4D) of radar echo classifications, since it did not appear possible, owing to the difficulties already encountered with conventional weather radars, to set up in the overlap region a suitable combination of the various results, for example "precipitation" as radar echo classification from a weather radar and "ground echo" as radar echo classification from another weather radar for the overlap region.

It is therefore an object of the invention to provide a method for determining combined data of weather radars in an overlap region of the observation regions of at least two weather radars according to the preamble of claim 1 that enables a reliable compilation of combined data for radio echo classification in the overlap region.

This object is achieved by the features of claim 1.

A method is thereby produced that determines combined data of weather radars in an overlap region of the observation regions of at least two weather radars. Polarimetric weather radars are used for the at least two weather radars that form an overlap region of the respective observation regions. The use of two differently polarized signals of the polarimetric weather radars enables a measurement of the differential reflectivity, the linear depolarization, the differential phase shift, the specific differential phase shift and the polarimetric correlation coefficient, as well as a measurement of the reflectivity, the radial velocity and/or the spectral width of the radial velocity for at least one polarization direction. The measuring signals or values of the measured variable are combined at individual measuring points for the overlap region. The measuring signals thus averaged and/or weighted make it possible for the first time to determine combined data in overlap regions for polarimetric weather radars.

The measuring signals or values of the measured variable can preferably be combined for the measuring points in the overlap region such that averaging or weighting of the measuring signals of the at least two weather radars is carried out in order to undertake a radar echo classification with the aid of the averaged or weighted measuring signal. The averaging or weighting is performed for each measuring point in the overlap region with the aid of the direct measured data. Averaging or weighting the measuring signals of the at least two weather radars enables a simple unambiguous acquisition that permits an unambiguous radar echo classification. The weighting of the measuring signals or measured values can be carried out such that the measured variable, associated with a quality or a probability, of each individual one of the at least two weather radars is weighted as it reproduces the quality or the probability. A measured variable associated with a lesser quality or probability is less strongly weighted than a measured variable of higher quality or higher probability.

For the measuring points of each individual radar unit, it is preferred to take account not only of a single echo classification in each case, but rather of a multiplicity of classifications that come into question, the classifications $K_{ij}$ that result for each individual radar unit (with the number j) and for each individual echo type or radar echo classification coming into question (with number i) being provided with associated weighting factors $w_{ij}$ that are characteristic of the respective classification $K_{ij}$. Such characteristic weighting factors $w_{ij}$ can result, for example, from the calculation of the respective echo classification, for example by means of a fuzzy logic algorithm.

Furthermore, before the calculation of the classification in the overlap region, it can be preferred to provide for each individual radar only in each case a single echo classification, preferably the most likely one (which corresponds to the conventional classification with the measured values of a radar). The weighting factors $w_{ij}$ that correspond to the classification not to be provided can be considered as vanishing for this purpose.

A two-dimensional or three-dimensional spatial grid can be used for the measuring points in order to enable the unambiguously determined results for the combined data in the overlap region to be effectively represented. Consequently, a visual conversion into a form that can be displayed is obtained in addition to the unambiguous determination of the data in the overlap region.

In order also to render possible a temporal sequence of the determined combined data in the overlap region, a three-dimensional spatial grid with the time axis as fourth dimension can be used. The assignment in the temporal sequence of the data obtained is thereby possible in addition to the good spatial representation.

It is preferred to use a two- or three-dimensional spatial grid for each of the measuring points in the overlap region. A common weighting factor $w_i$ is calculated for each radar echo classification for each of the measuring points of the spatial grid from weighting factors $w_{ij}$ that are characteristic of each individual radar unit (with the number j) and for each individual echo type or radar echo classification (with number i) coming into question. In this case, the function of the common weighting factor $w_i$ is dependent on the individual weighting factors $w_{ij}$, i.e. $w_i=fkt(w_{i1}, w_{i2}, \ldots, w_{iM})$ for a number M of radar units. This type of combination enables the radar echo classifications to be combined as had so far not seemed possible because there were already difficulties for the overlap region in the case of conventional radar units.

For a further improvement of the result for the overlap region, it is possible to determine as the overall result of the radar echo classification the radar echo classification of the at least two weather radars that represents the "more severe" result of the radar echo classification. It is ensured in this way that a display of possible "bad" weather comes through in the overlap region, and the covering over of the measurement of a severe radar echo classification in the overlap region by a not so severe radar echo classification is prevented. A simple averaging would consequently lead to a radar echo classification that is no longer so severe, which is not desired.

The individual weighting factors $w_{ij}$ are preferably modified by taking account of a weighting, determined in advance, of the respective determined radar echo classification. It is thereby possible for predetermined radar echo classifications to be given a higher weight since a higher weight is apportioned to weather events associated with the radar echo classification. The possible measurement by one of the at least two weather radars is intended to have the effect that the predetermined radar echo classification of higher weight is not covered over by a radar echo classification of lower weight when averaging the two radar echo classifications.

The weighting of the radar echo classification is preferably undertaken by the numerical coding of weather types. A large numerical value is used for a more highly weighted radar echo classification. It is hereby possible to undertake a simple numerical weighting of the radar echo classifications that produces an unambiguous result.

It may, in particular, be provided that the individual weighting factors $w_{ij}$ are modified by means of a further weighting factor $g_j$ characteristic of each of the at least two respective polarimetric weather radars. The individual weighting factors $w_{ij}*$ thus modified can be used to calculate the common weighting factor $w_i$ for each radar echo classification. The function of the common weighting factor $w_i$ is dependent on the modified individual weighting factors $w_{ij}*$, that is to say $w_i = fkt(w_{i1}*, w_{i2}*, \ldots, w_{iM}*)$ for a number M of radar units. With this type of combination, it is possible to combine the radar echo classifications, something which had so far seemed impossible given that there were already difficulties in the case of conventional radar units for the overlap region, and it is also possible, in addition, to take account of any further influences on the part of the weather radars forming the overlap region such as, for example, complex weighting factors that stem, inter alia, from the terrain information and the distance of the respective weather radar.

For quick and unambiguous calculation, it is preferably possible to form the common weighting factor $w_i$ by the mean value, the maximum, the sum or the product of the individual weighting factors $w_{ij}$ or individual modified weighting factors $w_{ij}*$. This provides a solution that is quick to process and requires few resources and little time.

It can, moreover, be preferred for the modified weighting factor $w_{ij}*$ to be formed from the individual weighting factors $w_{ij}$ and the further weighting factor $g_j$, characteristic of the respective weather radar, by the mean value, the maximum, the sum or the product of the modified weighting factor $w_{ij}*$ and the further weighting factor $g_j$. Modified weighting factors $w_{ij}*$ are thereby determined whose calculation requires few resources and little time but takes account of possible influences on the combination of the measured values in the overlap region.

When the characteristic weighting factor $g_j$ is determined by taking account of the distance of the polarimetric weather radar from the measuring point, of at least one of the variables measured or derived by the polarimetric weather radar, and/or of a variable describing the measurement quality of the polarimetric weather radar, the influences of the at least two weather radars on the measured values at the measuring points in the overlap region are taken into account in a fashion that spares resources, and with little expenditure of time.

Preferably, the radar echo classification that constitutes the most severe radar echo classification predetermined in advance is selected for the measuring points of the overlap region. As a result, a severe radar echo classification is not covered over by a not so severe radar echo classification, and a quick method is specified that takes poor weather and/or a severe radar echo classification into account.

In particular, the severity of the radar echo classification can be undertaken by the numerical coding of weather types. A large numerical value is used for a severe radar echo classification. The numerical coding renders it possible to compile a qualitative result such as a radar echo classification for a measuring point and/or measuring region.

By determining further data or measured variables through use of LIDAR, ceilometers, a radiosonde, Micro Rain Radar, SODAR, AWOS or disdrometers in the overlap region, it is possible for the purpose of a reliable combination of the measured values to perform a weighting with the aid of the further data, and/or to carry out a correlation with the data of the polarimetric weather radars of the overlap region.

Further refinements of the invention are to be gathered from the subclaims and the following description.

The invention is explained in more detail below with the aid of the exemplary embodiment illustrated in the attached FIGURE.

The sole FIGURE is a schematic of a combined network of weather radars.

In the sole FIGURE, a circle respectively shows schematically an observation region about a polarimetric weather radar 1 illustrated as a point. A plurality of polarimetric weather radars 1 are used in order to acquire the weather data over an entire area, the result being a combined network of polarimetric weather radars 1. The circular configuration of the individual observation regions of each polarimetric weather radar 1, and the complete coverage of the area give rise to overlap regions 2 that are formed by the observation regions of at least two polarimetric weather radars 1.

As the polarimetric weather radars 1 in the nonintersecting acquisition region evaluate the data individually at a local level, in some circumstances there is to be found in an overlap region 2 a plurality of measurement results from the polarimetric weather radars 1 forming the overlap region 2.

In order to determine combined data for the overlap region 2 from the measuring signals of the polarimetric weather radars 1, the measurements of the individual polarimetric weather radars 1 forming the overlap region 2 are combined for measuring points.

In an exemplary embodiment, the measuring signals or values of the measuring variable for the measuring points are combined in the overlap region 2 such that the measuring signals of the at least two weather radars 1 are averaged or weighted in order to undertake a radar echo classification with the aid of the averaged or weighted measuring signal. The averaging or weighting is performed for each measuring point in the overlap region 2 with the aid of the direct measured data. The weighting of the measuring signals or measured values can preferably be carried out such that the measured variable, associated with a quality or a probability, of each individual one of the at least two weather radars 1 is weighted as it reproduces the quality or the probability. A measured variable associated with a low quality or probability is weighted less strongly than a measured variable of high quality or high probability.

The combined data in the overlap region 2 are determined in a two- or three-dimensional spatial grid for the individual measuring points. The spatial grid can be visualized easily in printouts or on a display screen. For the purpose of displaying a temporal sequence of the determined combined data in the overlap region 2, it is also possible to provide the use of a three-dimensional spatial grid with the time axis as fourth dimension.

In a further exemplary embodiment, a two- or three-dimensional spatial grid is used for each of the measuring points in the overlap region 2. For each of the measuring points of the spatial grid, a radar echo classification is initially undertaken for each individual one of the weather radars 1 encircling this measuring point such that there are present for each measuring point in the overlap region 2 a plurality of (in the number of weather radars 1, which form the overlap region 2 with their respective observation regions), and possibly different and/or contradictory echo types or radar echo classifications. A common weighting factor $w_i$ is then calculated for each radar echo classification from weighting factors $w_{ij}$ that are characteristic of each individual weather radar 1 (with the integer number j) and for each individual echo type or radar echo classification (with the integer number i) coming into question. In this case, the function of the common weighting factor $w_i$ is dependent on the individual weighting factors $w_{ij}$, that is to say $w_i=\text{fkt}(w_{i1}, w_{i2}, \ldots, w_{iM})$ for a number M of weather radars 1.

In this further exemplary embodiment, it is preferred not only to determine respectively a single echo classification for each of the measuring points in the overlap region 2 for each individual one of the weather radars 1 encircling this measuring point, but to take account of a multiplicity of classifications coming into question, the classifications $K_{ij}$ that result for each individual weather radar 1 (with the number j) and for each individual echo type or radar echo classification (with number i) coming into question being provided with associated weighting factors $w_{ij}$ that are characteristic of the respective classification $K_{ij}$. Such characteristic weighting factors $w_{ij}$ can result, for example, from the calculation of the respective echo classification, for example by means of a fuzzy logic algorithm. Consequently, a plurality of, and possibly different and/or contradictory echo types and radar echo classifications are present for each measuring point in the overlap region 2. A common weighting factor $w_i$ is then calculated for each radar echo classification from weighting factors $w_{ij}$ that are characteristic of each individual weather radar 1 (with the integer number j) and for each individual echo type or radar echo classification (with the integer number i) coming into question. In this case, the function of the common weighting factor $w_i$ is dependent on the individual weighting factors $w_{ij}$, that is to say $w_i=\text{fkt}(w_{i1}, w_{i2}, \ldots, w_{iM})$ for a number M of weather radars 1. Subsequently, those echo classifications $K_i$ whose associated common weighting factor $w_i$ is greatest are used as final classification for this measuring point in the overlap region 2.

The individual weighting factors $w_{ij}$ are preferably modified by taking a weighting, determined in advance, of the respective determined radar echo classification into account.

The weighting of the radar echo classification is preferably undertaken by the numerical coding of weather types, the coding of the World Meteorological Organization being used by way of example.

It can, in particular, be provided that the individual weighting factors $w_{ij}$ are modified by means of a further weighting factor $g_j$ characteristic of each of the at least two respective polarimetric weather radars 1. The individual weighting factors $w_{ij}*$ thus modified can be used to calculate the common weighting factor $w_i$ for each radar echo classification. The function of the common weighting factor $w_i$ is dependent on the modified individual weighting factors $w_{ij}*$, that is to say $w_i=\text{fkt}(w_{i1}*, w_{i2}*, \ldots, w_{iM}*)$ for a number M of weather radars 1.

By determining further data or measured variables through the use of LIDAR, ceilometers, a radiosonde, Micro Rain Radar, SODAR, AWOS or disdrometers in the overlap region 2 for the purpose of a reliable combination of the measured values, a weighting can be performed with the aid of the further data or a correlation can be carried out with the data of the polarimetric weather radars 1 of the overlap region 2.

In a further step, the classified local radar data and the combined radar data can be converted in a suitable manner into the standardized Asterix CAT008 and Asterix CAT009 Eurocontrol Format, Asterix being an acronym for the data exchange protocol that is used in the field of flight safety at Eurocontrol and stands for "all purpose structures eurocontrol surveillance information exchange". The various types of data are differentiated into categories, with categories 008 and 009 being claimed for local radar data (CAT008) and combined radar data (CAT009).

It can, furthermore, be provided that the classified radar data determined on the two- and three-dimensional spatial grids are subdivided further into classes that are determined by threshold values that were derived from the code tables 4561 and 4677 of the World Meteorological Organization, "WMO Manual on Codes".

It is likewise possible to undertake segmentation, that is to say a division of the classified data into various geographic zones and elevations.

The invention claimed is:

1. A method for determining combined data of weather radars in an overlap region of the observation regions of at least two weather radars, use being made of a two- or three-dimensional spatial grid for each of the measuring points in the overlap region, characterized in that polarimetric weather radars are used as weather radars, and initially a radar echo classification is respectively calculated for each measuring point of the spatial grid from the measurements of each individual polarimetric weather radar, a plurality of radar_echo classifications of the individual weather radar thereby being present for each measuring point, and in that a common weighting factor $w_i$ is then calculated for each radar echo classification from individual weighting factors $w_{ij}$ that result for each individual polarimetric weather radar and for each individual radar echo classification, a function of the common weighting factor $w_i$ being adopted in dependence on the individual weighting factors $w_{ij}$, where $w_i=\text{fkt}(w_{i1}, w_{i2}, \ldots, w_{iM})$, i corresponding to the integer number of the radar echo classification and j corresponding to the integer number of a weather radar for a total number of M weather radars.

2. The method as claimed in claim 1, characterized in that the individual weighting factors $w_{ij}$ are modified by taking account of a weighting, determined in advance, of the respective determined radar echo classification.

3. The method as claimed in claim 2, characterized in that the weighting of the radar echo classification is undertaken by the numerical coding of weather types, and a large numerical value is used for a more highly weighted radar echo classification, the numerical coding of weather types being undertaken with the aid of the severity of the weather types, and a large numerical value is used for a severe weather type.

4. The method as claimed in claim 1, characterized in that the individual weighting factors $w_{ij}$ are modified by means of a further weighting factor $g_j$ characteristic of each of the at least two respective polarimetric weather radars of the overlap region, and the individual weighting factors $w_{ij}*$ thus modified are used to calculate the common weighting factor $w_i$ for each radar echo classification, and a function of the common weighting factor $w_i$ is adopted in dependence on the modified individual weighting factors $w_{ij}*$, where $w_i=\text{fkt}(w_{i1}*, w_{i2}*, \ldots, w_{iM}*)$.

5. The method as claimed in claim 1, characterized in that the common weighting factor $w_i$ is formed by the mean value, the maximum, the sum or the product of the individual weighting factors $w_{ij}$ or individual modified weighting factors $w_{ij}*$.

6. The method as claimed in claim 1, characterized in that the modified weighting factor $w_{ij}*$ is formed from the individual weighting factors $w_{ij}$ and the further weighting factor $g_j$, characteristic of the respective weather radar, by the mean value, the maximum, the sum or the product of the modified weighting factor $w_{ij}*$ and the further weighting factor $g_j$.

7. The method as claimed in claim 6, characterized in that the characteristic weighting factor $g_j$ is determined by taking account of the distance of the polarimetric weather radar from the measuring point, of at least one of the variables measured or derived by the polarimetric weather radar, and/or of a variable describing the measurement quality of the polarimetric weather radar.

8. The method as claimed in claim 1, characterized in that at least one of the following variables is used as a direct measurement of the individual polarimetric weather radar: differential reflectivity, linear depolarization, differential phase shift, specific differential phase shift, polarimetric correlation coefficient, and/or reflectivity measured from at least one polarization direction, radial velocity and/or spectral width of the radial velocity.

* * * * *